United States Patent [19]

Welch et al.

[11] Patent Number: 4,664,217
[45] Date of Patent: May 12, 1987

[54] ELECTRIC SHIFT ACTUATOR FOR VEHICLE TRANSFER CASE

[75] Inventors: David W. Welch, Columbus, Miss.; Carl G. Czarnecki, Dearborn Heights, Mich.; Joseph DiTucci, Simsbury, Conn.

[73] Assignee: United Technologies Electro Systems, Inc., Columbus, Miss.

[21] Appl. No.: 686,120

[22] Filed: Dec. 24, 1984

[51] Int. Cl.$^4$ ............................................. B60K 23/08
[52] U.S. Cl. ................................. 180/247; 74/337.5; 192/0.092; 192/3.55
[58] Field of Search ................ 180/247, 233; 74/335, 74/337.5; 192/0.092, 0.033, 0.08, 3.58, 3.55; 318/590, 591, 602

[56] References Cited

U.S. PATENT DOCUMENTS

| | | | |
|---|---|---|---|
| 2,823,345 | 2/1958 | Ragland | 318/602 |
| 3,089,571 | 5/1963 | Schick | 74/337.5 |
| 3,280,946 | 10/1966 | Guibeaud | 192/0.092 |
| 3,283,298 | 11/1966 | Kaiser | 180/247 |
| 4,421,335 | 12/1983 | Makishima | 180/247 |

Primary Examiner—John J. Love
Assistant Examiner—Everett G. Diederiks, Jr.
Attorney, Agent, or Firm—Stephen A. Schneeberger

[57] ABSTRACT

A shift actuator for a vehicle transfer case includes a bidirectional electric motor for positioning gearing in the transfer case. An indicator mechanism associated with the drive train between the motor and the transfer case provides electrical signals indicative of the actual position in, and thus operating state, of the gearing in the transfer case. A selector switch provides electrical signals indicative of a desired operating state of the transfer case gearing. An electronic control is responsive to an input from the selector switch and to the indicator mechanism for effecting rotation of the motor in a predetermined one or other direction to attain the desired operating state. The indicator mechanism includes a contact plate, which rotates with the drive train, and a set of stationary contacts. A conductive pattern on the contact plate identifies the positioning of the operating states of the transfer case gearing. Signals indicating the condition of the vehicle, as its speed and the state of its transmission, serve to allow or to inhibit certain responses to certain selected states of the transfer case gearing.

11 Claims, 5 Drawing Figures

ELECTRIC SHIFT ACTUATOR FOR VEHICLE TRANSFER CASE

DESCRIPTION

1. Technical Field

The invention relates to a shift actuator for vehicle gearing and more particularly to an electrically controlled shift actuator for a vehicle transfer case.

2. Background Art

Certain land vehicles are provided with a four-wheel drive "4WD" capability. In addition to transmitting engine torque through a transmission to a pair of normally driven wheels, the torque may also be selectively connected to drive another set of wheels. Such transmission of the torque to either one set or two sets of wheels is afforded by a transfer case containing appropriate vehicle drive gearing which is shiftable between two-wheel drive and four-wheel drive modes. Additionally, that vehicle drive gearing may be structured so as to provide selection of either a "high" range or a "low" range of speeds in one or both of the two-wheel drive and four-wheel drive modes.

To move into or out of four-wheel drive and/or between "high" and "low" speed ranges, it has been conventional to use linkages connected to a control lever which was manually actuatable by the operator. Such arrangements have been entirely mechanical in nature. More recently, varying forms of electronic control have been disclosed. For instance, U.S. Pat. No. 4,433,748 discloses an instructing system for a four-wheel drive vehicle which senses the relative speeds of front and rear wheels and acuates a lamp when the difference exceeds some threshold. However, the operator is still required to manipulate the shift lever which mechanically moves the gearing into the four-wheel drive mode without further electrical assistance.

Other patents which disclose various degrees of electronic control for vehicle transmissions include U.S. Pat. Nos. 4,140,031; 4,312,248; and 4,419,909. These three patents do not appear to be concerned with the shifting of a four-wheel drive transmission case. The U.S. Pat. No. 4,312,248 is concerned with the automatic shifting of a sub-transmission without any form of manual input. The U.S. Pat. No. 4,419,909 discloses a control system for reversing the drive direction of a vehicle such as a wheeled loader. Various sensors determine the speed and direction of rotation of a power transmission system for controlling a response to a command determined by actuation of a selector lever. The U.S. Pat. No. 4,140,031 discloses a control system for effecting a speed ratio change in an automatic transmission. The positioning of the gearing of the transmission is controlled by a plurality of selector rods, and a device is disclosed in U.S. Pat. No. 3,943,792 for determining the positioning of those selector rods so as to provide a gear position signal for the control system of U.S. Pat. No. 4,140,031.

Recent development of a four-wheel drive transfer case having a bidirectional rotary input has necessitated the development of an appropriate shift actuator for use with such transfer case.

3. Disclosure Of Invention

It is a principal object of the invention to provide a shift actuator and particularly an electrical shift actuator for a vehicle transfer case having a bidirectional rotary input. Included within this object is the provision of an electrical shift actuator which effects electromechanical shifting of a four-wheel drive vehicle. It is a further object that the shift actuator respond to simple manual inputs for rapidly, safely and accurately effecting the desired response.

According to the invention there is provided an electrical shift actuator for a vehicle transfer case. The transfer case includes vehicle drive gearing and is responsive to a bidirectional rotary input for shifting the gearing into selected ones of a plurality of operating states, as for instance, neutral "N", two-wheel drive high "2H", four-wheel drive high "4H" and four-wheel drive low "4L". All of the operating states are typically attainable within less than 360° of rotation of the rotary input.

The shift actuator includes a motorized rotary drive, a device for indicating the rotational position of the rotary drive, a selector switch for providing signals indicative of a desired state of vehicle drive gearing and electrical control means for coordinating the action of the rotary drive, the position indicator and the selector switch. The rotary drive is operatively connected to provide the bidirectional rotary input to the transfer case and includes a bidirectional, preferably rotary motor, for determining the rotational position of the rotary drive. The position indicator is comprised of first and second relatively movable parts, the first part being mounted to rotate with the rotary drive and the second part being stationary. The position indicator provides an electrical signal indicative of the rotational position of the rotary drive which thereby provides an indication of the existing operating state of the vehicle drive gearing. The selector switch may in one embodiment provide a continuing electrical signal representative of a desired state of the vehicle drive gearing and in another embodiment may only be required to provide a momentary signal which is stored. The electrical control means respond to the signal representative of a desired state of vehicle drive gearing and to the signal indicative of the existing rotational position of the rotary drive for effecting movement of the motor in a predetemined one or the other of its directions until the desired vehicle drive gearing state is attained.

One part of the rotary drive position indicator includes a plurality of electrical contacts and the other part of that indicator comprises a surface, as on a disc, having a respective plurality of arcuate paths which underlie and are in engagement with the respective contacts. Predetermined portions of the arcuate paths are conductive and other portions are nonconductive. An electrical potential may be applied to at least some of the electrically-conductive path portions. The conductive and nonconductive path portions are patterned, relative to the contacts, to provide respective electrical signal indications representative of each of a plurality of angular positions each representative of a respective one of the operating states of the drive gearing.

The rotary drive includes reduction gearing having an input driven by the motor and an output for connection to the input of the transfer case. The position indicating plate is affixed to rotate with the output of the reduction gearing. The conductive patterning on the surface of the plate is disposed substantially perpendicular to the rotational axis of that output.

The electrical control includes a vehicle speed sensor and a sensor for determining a neutral condition of the vehicle's transmission and it operates to inhibit certain responses by the actuator to certain selected operating states so long as a speed threshold is exceeded or the vehicle neutral condition has existed for less than some minimum time.

In one embodiment, the conductive patterning on the position plate may serve to directly control rotation of the motor in one or the other of its directions by passage of an actuating current directly therethrough from the selector switch to a motor-contactor relay or similar switch for controlling the direction of motor rotation. In another embodiment, the electrical control may be structured to receive separate input signals from the selector switch and from the position indicating plate. The position indicating plate is patterned to provide digital signals indicative of respective operating positions. This latter arrangement is particularly suited for use with a microprocessor-based control.

BEST MODE FOR CARRYING OUT THE INVENTION

Figure 1:
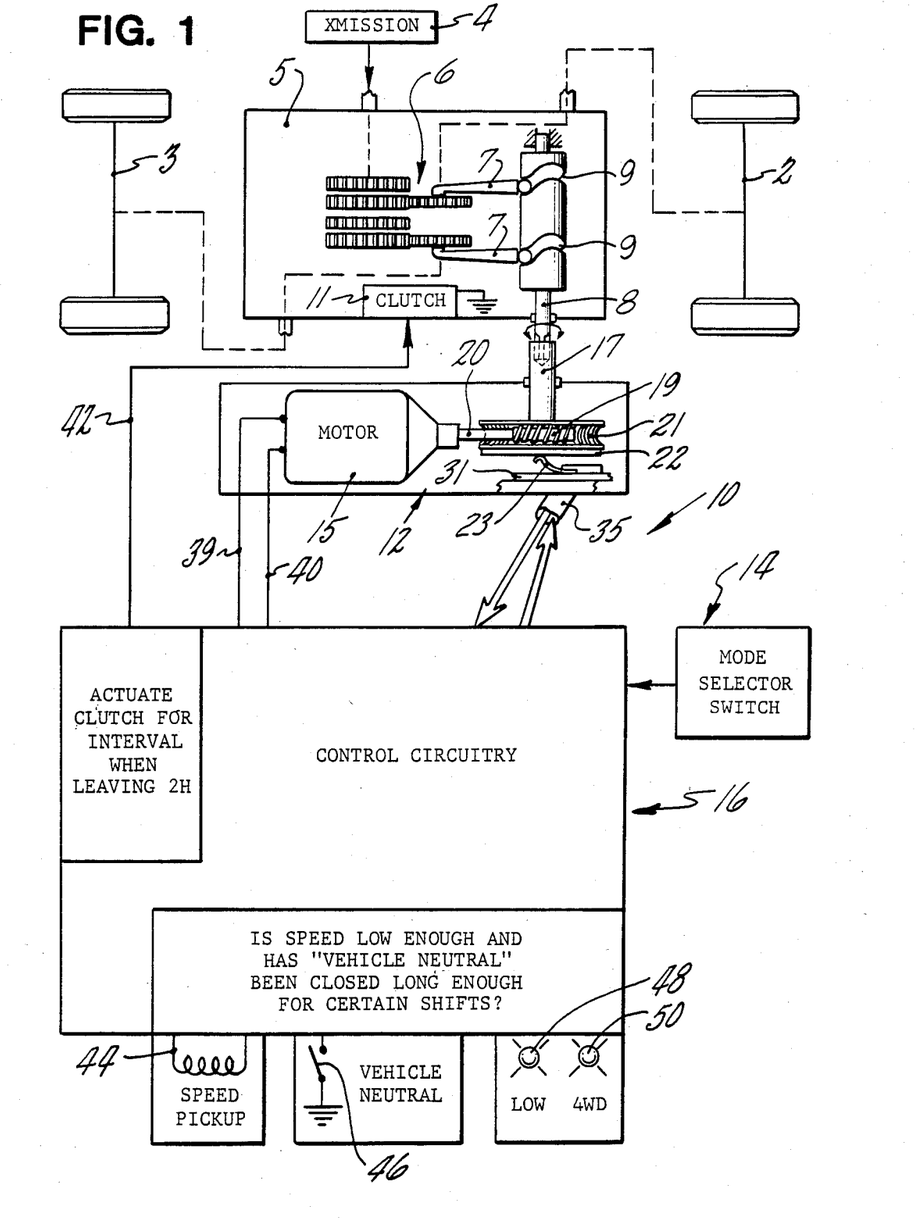
FIG. 1 is a generalized, schematic, block diagram of the shift actuation system of the invention operatively connected with a four-wheel drive transfer case.

Referring now to the drawings, FIG. 1 illustrates, in generalized schematic block diagram form, the shift actuation system of the invention operatively connected with a four-wheel drive transfer case, which is in turn associated with a land vehicle. Specifically, a vehicle (not shown) includes a set of front wheels 2 and a set of rear wheels 3, one, or both sets of which are driven by an engine (not shown) via a conventional transmission 4 and a four-wheel drive transfer case 5. The transfer case 5 contains vehicle drive gearing 6 which is adjustable to selected ones of a plurality of operating states by means of a pair of actuator yokes 7 in order to provide drive to the wheel sets 2 and 3 in accordance with the selected operating states. Specifically, in one operating state of gearing 6 2H, the transmission 4 is connected to only two wheels, as for instance the rear wheels 3. In two other operating states (4L and 4H), gearing 6 connects transmission 4 not only to rear wheels 3 but also to front wheels 2 to provide well-known four-wheel drive. Still further, the positioning of drive gearing 6 may be varied to provide four-wheel drive in a high range 4H or in a low range 4L. Still further, drive gearing 6 may be moved to an optional neutral N position which effectively disengages the transmission 4 from the wheel sets 2 and 3 and is typically used while towing the vehicle.

Recent developments in the technology of four-wheel drive transfer cases 5 by the Warner Gear Division of the Borg-Warner Company of Muncie, Ind. have resulted in a system whereby the several states of the drive gearing 6 may be attained via a simple bidirectional rotary input. Specifically, rotation of an input shaft 8 mounted in the transfer case 5 is operative to rotate a pair of cams 9 affixed thereto, which cams in turn operate to effect displacement of respective ones of the gear-actuating yokes 7. More specifically still, rotation of input shaft 8 to each of four angularly-different rotational positions is operative via the cams 9 and yokes 7 to set the drive gearing 6 in each of four respectively different operating states, i.e. N, 2H, 4H, and 4L. Conveniently, each of the aforementioned four operating states is attained at a respective one of four rotational positions of the input shaft 8, each positioned in quadrature with the other, though such particular angular spacing is not essential. Thus the shaft 8 and cams 9 are only required to be rotated through an angle of less than 360° (i.e. 270°) to effect all of the operating states, with each of the four operating positions being obtainable through bidirectional rotation of shaft 8. Referenced to the angular range of rotation of shaft 8, the 4L and 2H positions are at opposite extremes, with the neutral position N being intermediate the 4L position and the 4H position. An electric clutch 11 assists in synchronizing the gears 6 when shifting from two-wheel drive 2WD to four-wheel drive 4WD.

In accordance with the present invention there is provided an electrical shift actuation system generally designated 10, for safely and effectively translating an operator's selection of a desired operating state of the drive gearing 6 into effectuation of the actual operating state without reliance upon direct manual actuation of the drive gearing by the operator. Instead, the actuation system 10 responds to electrical signals from operator-actuated switches for electromechanically effecting actuation of the drive gearing to the desired operating state in accordance with certain conditional limitations.

Broadly speaking, the shift actuation system 10 comprises a motorized rotary drive assembly 12, a mode selector switch 14 and appropriate control circuitry 16 connected interactively between the motorized drive 12 and the selector switch 14. The selector switch 14 is responsive to various manual inputs for providing one or more signals representative of a desired operating state of the vehicle drive gearing 6. The motorized rotary drive assembly 12 includes a bidirectional, permanent-magnet fractional-horsepower DC motor 15 and a bidirectional rotary output shaft 17. The motor is operatively connected to drive the output shaft 17 via reduction gearing formed by worm gear 19 and toothed gear 21. The worm gear 19 is driven directly by and forms part of the shaft 20 of the armature of motor 15. The toothed gear 21 is coaxially mounted on output shaft 17 which is disposed perpendicularly to the motor shaft 20. The reduction ratio is about 30.5:1. The distal end of output shaft 17 is axially recessed, and that recess is radially contoured so as to provide a keyed socket for receiving and engaging the end of the transfer case input shaft 8 in a manner which transmits the angular position of shaft 17 to that of shaft 8. The speed of motor 15 and the ratio of the reduction gearing are such that the output shaft 17 may rotate 90° in 250 milliseconds under normal loading.

Because the output shaft 17 of the rotary drive assembly 12 is coupled to shaft 8 such that the two rotate in unison, it will be appreciated that not only may the shaft 17 be angularly driven and positioned so as to effect selected ones of the operating states of vehicle drive gearing 6, but conversely, the angular positioning of the output shaft 17 may be viewed as representing the actual operating state of the vehicle drive gearing 6 in existence at a particular moment. In accordance with the invention, the angular position of the output shaft 17 and its toothed gear 21 are utilized to provide an indication of the operating state of the vehicle drive gearing 6. More specifically, one or more electrical signals indicative of the angular position of the rotary drive shaft 17 and thus of the actual operating state of the vehicle drive gearing 6 are provided by a position sensing arrangement employing a patterned contact disc or plate 22 and a cooperating array of contact fingers 23.

Figure 2:
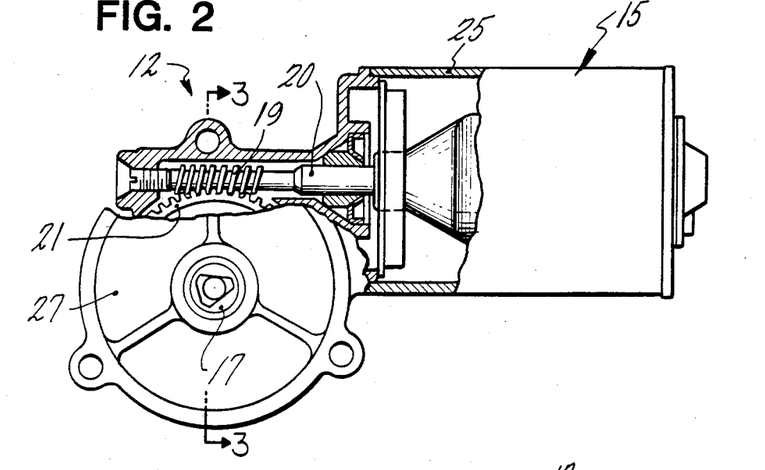
FIG. 2 is an elevational view, partly broken away and partly in section, of the rotary drive of the shift actuator.
Figure 3:
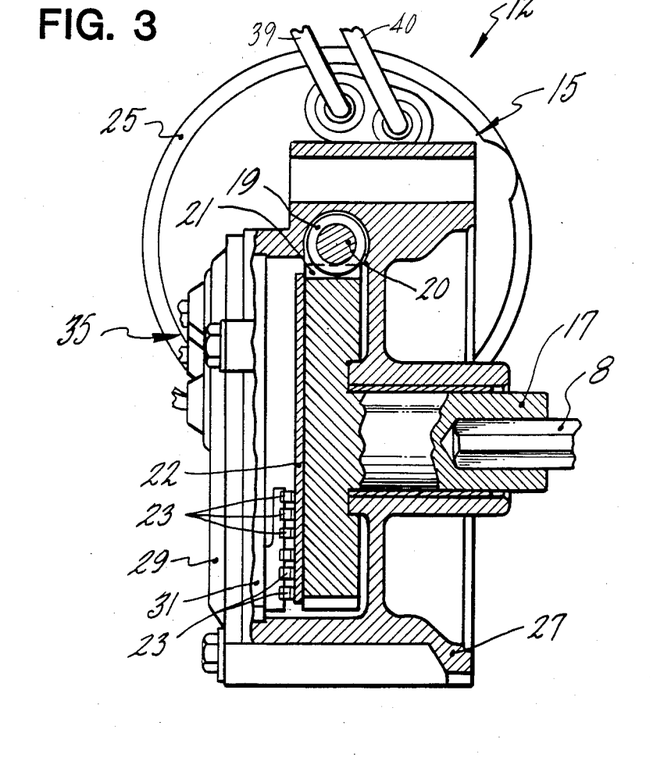
FIG. 3 is a partial, sectional view of the rotary drive and position sensing arrangement, taken along line 3—3 of FIG. 2.
Figure 4:
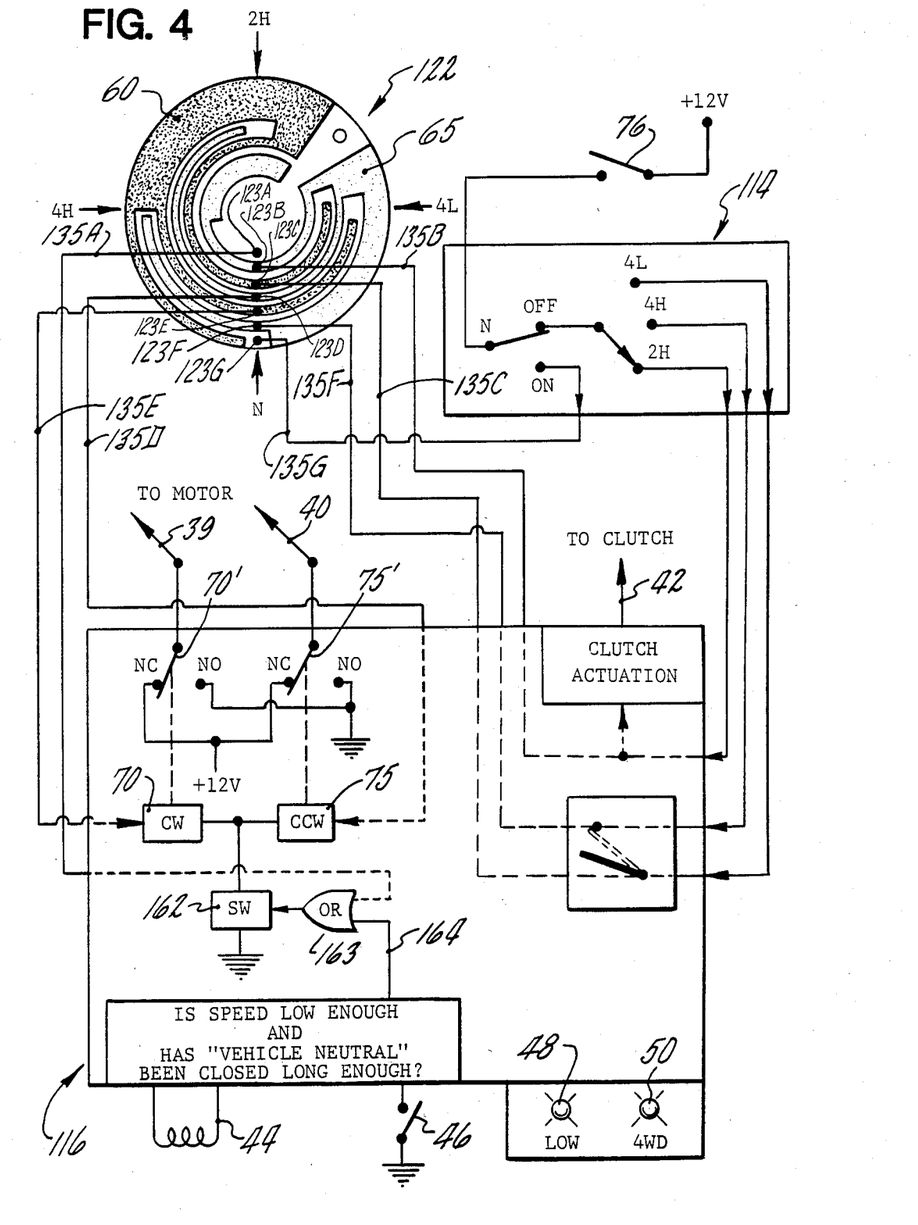
FIG. 4 diagrammatically illustrates the selector switch, position indicator and control circuitry in accordance with one embodiment of the shift actuator.
Figure 5:
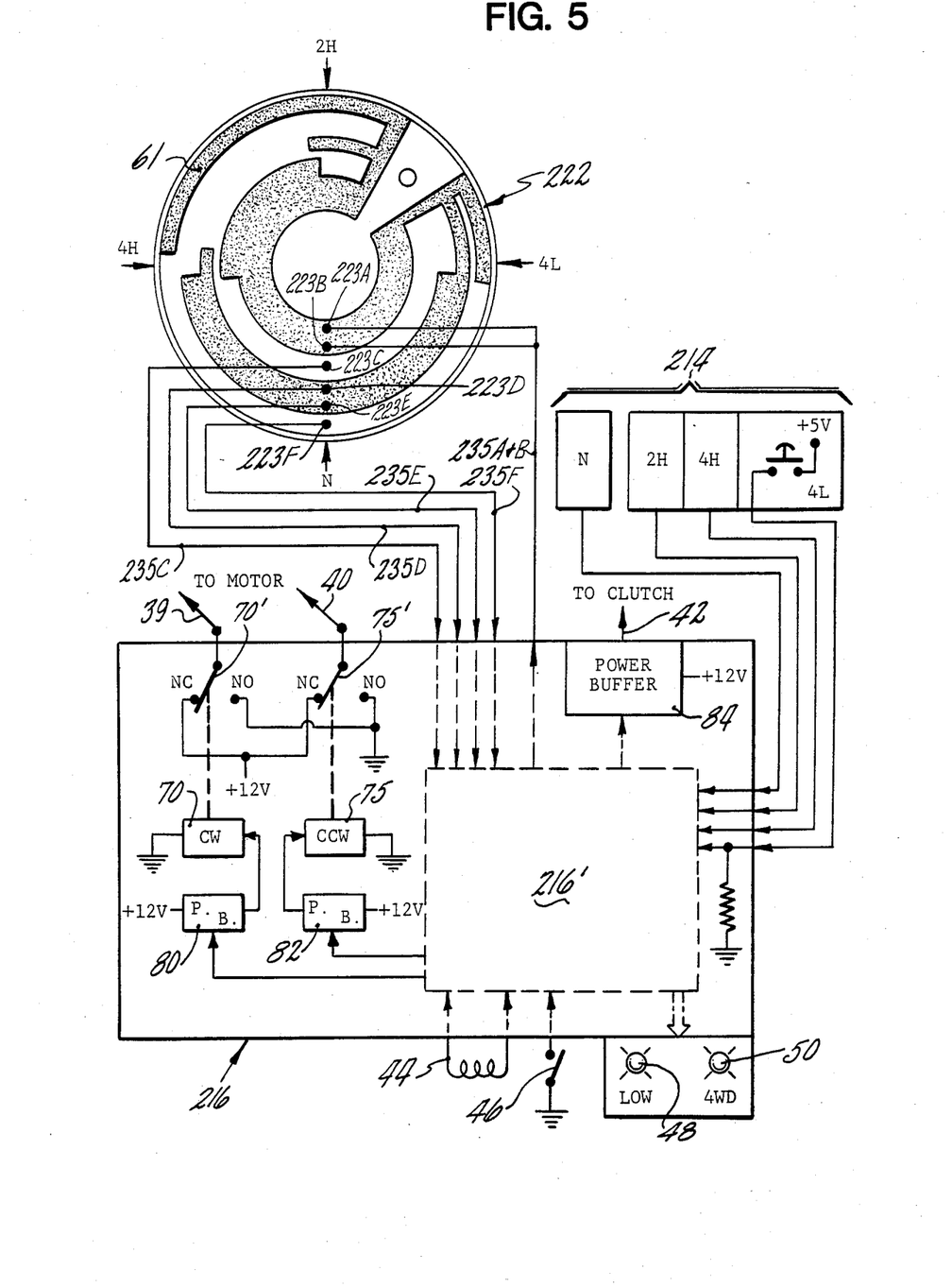
FIG. 5 diagrammatically illustrates the selector switch, position indicator and control circuitry in accordance with another embodiment of the shift actuator.

A more detailed illustration of the rotary drive assembly 12 and its associated position indicating mechanism are found in FIGS. 2 and 3 in which the motor 15 is contained within a housing 25 and the associated reduction gearing and output shaft 17 are contained in a housing 27 affixed thereto. The housing 27 may be rigidly connected to the transfer case 5, thereby maintaining the motorized output shaft 17 in coupled engagement with the rotary input shaft 8. A cover 29 is affixed to the housing 27, as illustrated in FIG. 3. The contact plate 22 is typically in the form of a thin disc of insulating material having a diameter only slightly less than that of the toothed gear 21. The contact plate 22 is securely mounted to an axial end face of the gear 21 in facing relation with the inside of housing cover 29, as by an adhesive and/or one or more rivets mutually connecting the two members to assure that plate 22 rotates with the gear 21. A conductive pattern, to be discussed hereinafter in greater detail with reference to FIGS. 4 and 5, is disposed on the exposed face of plate 22 for selective engagement with and disengagement from respective ones of the contact fingers 23 in the contact array.

In each of the embodiments to be hereinafter discussed, the contact array typically includes a plurality, i.e. 5–7, of contact fingers 23 which are each fixedly mounted at one end to a connection board 31 and extend in cantilevered fashion into resilient engagement with the patterned surface of the contact plate 22. The contact fingers 23 in an array are conveniently arranged such that they are parallel to one another and their respective points of contact with the patterned surface of contact plate 22 lie along a line extending radially from the center of the contact plate. The connection board 31 is conveniently affixed to the inner surface of cover 29 and includes electrical leads plated thereon for connecting each contact finger 23 with a respective one of the electrical leads 35 which extend through cover 29.

When either the contacts 23 or the electrical leads 35 are referred to herein collectively, the reference numeral may not bear a subscript, however, when an individual contact finger and/or respective electrical lead is referred to specifically, the corresponding aliphabetical subscript will be used.

Returning to the description of a generalized embodiment of the invention as depicted in FIG. 1, the mode selector switch 14 is typically responsive to selective manual inputs for initiating electrical signals indicative of the drive gearing 6 in either the neutral N, two-wheel 2H, four-wheel high 4H or four-wheel low 4L modes. Further, through the patterning of the conductive surfaces on the contact plate 22 and the relationship of the various contact fingers 23 thereto, electrical signals representative of the actual operating mode of the vehicle drive gearing 6 are available to the control circuitry 16 via at least some of the conductive leads 35. The control circuitry 16 is interactively associated with the mode selector switch 14 and with the signals from contact plate 22 to control energization of motor 15 in accordance with a predetermined control strategy. A pair of conductors 39 and 40 extending from the control circuitry 16 are operative to apply an energizing potential of 12 volts across the motor 15. By reversing the polarity of the 12 volt-to-ground potential appearing across conductors 39 and 40 as by switching its application to those respective conductors, the direction of rotation of motor 15 is similarly reversed. The clutch 11 associated with transfer case 5 is energized by a signal extended thereto on conductor 42 from control circuitry 16.

Associated with control circuitry 16 are a speed pickup coil 44, a VEHICLE NEUTRAL switch 46 and a pair of indicator lights 48 and 50 for indicating low range operation and four-wheel drive operation, respectively. The speed pickup 44 represents the sensor portion of a tachometer-generator (not shown) that is geared to the transfer case 5 to provide an indication of vehicle speed. As the vehicle speed increases, the frequency of the voltage across pickup coil 44 increases proportionately. An appropriate threshold circuit associated with control circuitry 16 is operative to provide outputs of opposite binary state depending upon whether the vehicle speed is above or below a threshold of about four miles per hour.

The VEHICLE NEUTRAL swith 46 is actuated by the clutch on a manual transmission vehicle or by the shift selector on an automatic transmission vehicle. If the clutch pedal is depressed or the shift selector is in "park" or "neutral" such that transmission 4 is in its neutral condition, the input from this switch is at ground potential, otherwise it is held high.

The control strategy and functional interaction of the electrical shift actuator 10 and the drive gearing 6 of transfer case 5 are in accordance with the following description. The motor 15 is capable of being driven either clockwise or counterclockwise to actuate the vehicle drive gearing 6 from an existing position to one which corresponds with a desired position selected at selector switch 14. The determination of the direction in which motor 15 is to rotate is in accordance with logic which may be associated with control circuitry 16 and/or via the pattern of the conductor disposed on the surface of contact plate 22 as will be hereinafter described in greater detail. Additionally, certain operating conditions must exist before certain shifts may be made from certain modes of drive gearing 6 to certain other modes of that drive gearing. Specifically, energization of motor 15 is inhibited from shifting the gearing 6 into or out of the low range 4L or into or out of the neutral condition N unless and until the vehicle speed as sensed by pickup 44 is less than a predetermined value, in this instance four miles per hour, and the VEHICLE NEUTRAL switch 46 has been closed for a predetermined interval, typically in the range of 0.1 to 0.5 second. These conditions are intended to inhibit an abrupt shift, either up or down, in the speed range which might result on the one hand in an abrupt stopping of the vehicle or on the other hand in an undesirable reduction of the engine's drag while on a steep incline. The requirement that the VEHICLE NEUTRAL switch 46 be closed for at least a short interval is to allow the engine speed to slow down in case the operator for some reason decides to make a change in the transfer case drive gearing 6 while the engine is running and the transmission 4 is in its own neutral condition.

Shifting the vehicle drive gearing 6 from two-wheel drive high 2H to four-wheel drive high 4H or vice versa is not subject to the aforementioned inhibiting conditions and is permitted at any time regardless of vehicle speed or the state of the VEHICLE NEUTRAL switch 46.

If the drive gearing is in the 2H position and four-wheel drive low range 4L operation is selected, the control circuitry 16 and motor 15 respond by shifting the gearing 6 to the four-wheel drive high range 4H condition and remaining there until the inhibiting conditions of vehicle speed and VEHICLE NEUTRAL switch closure duration have been satisfied and removed, whereupon the shift to 4L is completed automatically without further operator action.

To assist in synchronizing the gears 6 of the transfer case 5 when shifting from 2H to either 4H or 4L, the electrical clutch 11 is energized for approximately five seconds. The control circuitry 16 notes when the selector switch 14 is moved from the 2H position to any other position, as by a change in level of that signal, and accordingly starts a five second timer for applying a five second "clutch actuating" signal to the clutch 11 via conductor 42.

When the motor 15 completes actuation of the drive gearing 6 to, or nearly to, a desired operating state, the energizing potential previously appearing across conductors 39 and 40 is terminated and those two conductors are connected to a common potential such that the brushes of motor 15 are connected together to provide dynamic braking. Such dynamic braking greatly reduces coasting of the motor's armature and the motor quickly comes to rest to accurately position the system without overshoot.

The control circuitry 16 responds to the signals from selector switch 14 and to the presence or absence of the inhibiting signal for controlling the illumination of the indicating lights 48 and 50. In the 2H condition, neither of the lamps 48 and 50 is illuminated. On the other hand, when a four-wheel drive condition of either 4L or 4H is selected, the 4WD light 50 is illuminated. If the four-wheel drive low range 4L is selected, the lamp 48 will be illuminated continuously when that position is attained. On the other hand, when shifting into or out of the low range, the lamp 48 will be caused to flash so long as either of the VEHICLE NEUTRAL switch actuation or the maximum vehicle speed requirements is not satisfied. Upon satisfaction of these latter requirements, the LOW lamp 48 will either be continuously illuminated or extinguished, as appropriate.

The control circuitry 16 for effecting the aforementioned modes of control and response may take several forms, particularly as might be determined by the location of the control circuitry 16. In those instances in which the circuitry 16 is to be located at or within the housing associated with either transfer case 5 or the drive assembly 12 to minimize the length of various connecting conductors, the temperatures and general conditions of such environment may preclude the use of a microprocessor-based system. On the other hand, where the control circuitry 16 may be located remotely from the transfer case 5 and drive assembly 12, as for instance near the instrument panel of the vehicle, many of the aforementioned logic functions may be implemented through the use of a suitably programmed microprocessor. In each instance, the aforementioned logic functions are readily provided by the control circuitry 16, however, alternate forms of the rotary position indicating mechanism including the array of contacts 23 and the patterned conductors of contact plate 22 may exist and are described hereinafter with reference to FIGS. 4 and 5.

Referring to FIG. 4, there is illustrated one arrangement for the selection of desired operating positions and for the indication of the actual operating position, including the generalized control circuitry associated therewith. With reference to the description of the embodiment of FIG. 4, those elements specifically applicable to that embodiment are represented by three-digit reference numerals, with the first digit being a 1. An array of seven contact fingers, $123_A-123_G$ make contact with the surface of a contact plate 122 as illustrated by the line of dots in FIG. 4. The contact fingers $123_A-123_G$ are fixedly positioned and the contact plate 122 is rotatable either clockwise (CW) or counterclockwise (CCW) such that respective arcuate paths are described on the contact surface of plate 122.

A pair of electrically-separate, arcuate, conductive surfaces 60 and 65 are disposed on the surface of contact plate 122, as by plating. The conductive contact surfaces 60 and 65 extend in opposite arcuate directions and are each subdivided into several arcuate, finger-like paths which underlie certain different ones of the contact fingers $123_A-123_G$. These finger-like paths may be referred to by the alphabetical subscript associated with the particular contact $123_A-123_G$ which it underlies. Generally speaking, the finger-like arcuate conductive paths $60_C$, $60_E$ and $60_G$ are interdigitated with the oppositely extending conductive paths $65_{A/B}$, $65_D$ and $65_{F/G}$. To maintain electrical separation, the fingers of conductor 60 are radially spaced from the fingers of conductor 65. Importantly also, the angular extent of each of the fingers of conductor 60 and 65 is such that a portion of the arcuate path described by contact plate 122 as it rotates beneath a respective one of the contact fingers $123_A-123_G$ is conductive and in most instances, some other portion is nonconductive.

By selectively patterning the angular position and extent of each of the conductive and nonconductive portions of the arcuate paths, it is at least possible to convey angular positional information to respective ones of the contact fingers $123_A-123_G$ regarding the position of output shaft 17 and thus the operating state of vehicle drive gearing 6. In further accordance with the embodiment illustrated in FIG. 4, the patterning of the arcuate conductors 60 and 65 may be utilized to control directly the application of an actuating electrical current to clockwise relay 70 and counterclockwise relay 75, respectively. Assuming it is designed to withstand the temperature conditions, the control circuitry 116 may be positioned at or near the motorized drive 12.

Relay 70 controls actuation of a single-pole, double-throw switch contact 70' from its normally-closed position with respect to lead 39 to its closed position with respect to ground. Similarly, relay 75 controls actuation of its switch contact 75' from its normally-closed position with respect to lead 40 to its closed position with respect to ground. Switch contact 70' is connected to motor lead 39 and switch contact 75' is connected to motor lead 40. The normally closed contacts of switches 70' and 75' are both connected to the same +12 volt potential. Similarly, both of the normally-open contacts of switches 70' and 75' are connected to a ground potential. When neither of relays 70 and 75 is energized, both leads 39, 40 to motor 15 are electrically connected to each other by the relays and the motor is dynamically braked.

When relay 70 is energized, the motor 15 is caused to rotate in the clockwise direction and conversely, when relay 75 is energized the motor is caused to rotate in the counterclockwise direction. At no time will both relays 70 and 75 be energized concurrently.

Sufficient electrical current for actuating either of the relays 70 or 75 is supplied thereto via the selector switch 114 and the conductive patterning 60 or 65 on contact plate 122. Specifically, a 12 volt supply voltage is connected to the input of a gear select switch 114 when the ignition switch 76 is closed. The 12 volt potential is first applied to the pole of a NEUTRAL switch N having ON-OFF positions. When the NEUTRAL switch is in the ON position, it is selecting the NEUTRAL position of the transfer drive gearing 6, which rotational position is designated N on contact plate 122. A lead $135_G$ connects the ON contact of the N switch to the appropriate contact $123_G$. It will be noticed that the contact $123_G$ overlies a nonconductive portion or "deadband" on the contact plate 122 when the plate is rotated by its NEUTRAL position N. In that position, no current may be passed to either of the relays 70, 75. On the other hand, if the contact plate 122 is positioned to either side of the NEUTRAL position N, the contact finger $123_G$ will make contact with one or the other of arcuate contact paths $60_G$ and $65_G$, in which case either a respective current path is provided to relay 70 through conductive lead $135_E$ which is connected to contact $123_E$ and is in engagement with one of the arcuate fingers of conductive surface 60 or a respective current path is provided to relay 75 via conductive lead $135_D$ which is connected to contact $123_D$ and is in contact with one of the arcuate fingers of conductive surface 65.

If the selector switch N is in the OFF position, the 12 volt potential is then extended to that portion of the selector switch 14 which allows selection of the 2H, 4H or 4L mode of operation via selection of the respective contact. The 2H selector switch contact is connected substantially directly to the finger contact $123_B$ via a conductive lead $135_B$. Similarly, the 4H selector switch contact is connected substantially directly to the finger contact $123_F$ via a conductive lead $135_F$. In each instance, the control circuitry 116 may provide certain steering diodes (not shown). Additionally, the lead $135_B$ is extended to a CLUTCH ACTUATION portion of the control circuitry 116 to provide the clutch actuating signal to the clutch 11 via conductor 42. The selector switch contact 4L is connected with contact finger $123_C$ via a lead designated $135_C$ and indirectly through the control circuitry 116. However, if the selector switch 114 is moved from the 2H to the 4L position and the position of contact plate 122 is between the 2H and 4H positions, a portion of the control circuitry 116 is operative to shunt the 12 volt signal appearing at the 4L contact to the lead $135_F$ which extends to contact $123_F$, and in turn effects displacement of the motor to the 4H position. When the motor and contact plate 122 arrive at the 4H position, the 12 volt signal from selector switch contact 4L is then returned to the lead $135_C$ and further rotation of the system awaits satisfaction of the VEHICLE NEUTRAL and speed conditions.

While the description to this point has indicated how the 12 volt potential would be delivered to relay 70 or 75 via a selected contact 2H, 4H or 4L of the selector switch 114 and one or the other of the arcuate conductive strips 60 and 65 of the position plate 122 and a respective one or the other of the leads $135_E$ or $135_D$, it remains necessary to complete the circuit through the respective relay 70 or 75 to ground before the relay is actually energized. To afford this control, a semiconductor switch 162 is connected to control the flow of current through either relay 70 or 75 to ground. Isolating diodes (not shown) are utilized to prevent sneak current paths at various stages in the control circuitry 116. Control of the conduction of switch 162 and thus also of either relay 70 or 75 is effected by one or the other of a pair of control signals extended to the switch 162 via an OR gate 163. One of those control signals appears on lead $135_A$ from finger contact $123_A$ which allows rotation in the counter clockwise direction via conductor 65 so long as the contact plate 122 is between the 4H and 2H position. The other control signal is illustrated as appearing on lead 164 internal to the control circuitry 116 and is of an enabling level only when both the VEHICLE NEUTRAL switch 46 has been closed long enough and the vehicle speed is below four miles per hour.

Referring to FIG. 5 there is illustrated another arrangement for the selection of desired operating positions and for the indication of the actual operating position, including the generalized control circuitry associated therewith. With reference to the description of the embodiment of FIG. 5, those elements specifically applicable to that embodiment are represented by three-digit reference numerals, with the first digit being a 2. As with the description of the embodiment of FIG. 4, elements identical with those previously described bear the earlier reference numerals.

The control circuitry 216 is principally based upon a suitably programmed microprocessor 216' and is intended to be located, in the main, at a location in the vehicle which is not normally subjected to the temperature and environmental extremes which may occur at the motorized drive 12. Typically, most of the control circuitry 216 including the associated microprocessor will be positioned within the vehicle, as for instance near the instrument panel. The selector switch 214 serves to select desired operating positions and the contact plate 222 provides an indication of the actual operating position. Unlike the embodiment of FIG. 4, there is no requirement that a current of a magnitude sufficient to operate the relays 70 and 75 be passed through either the selector switch 214 or the conductive surfaces associated with contact plate 222. Instead, both the selector switch 214 and the contact plate 222 with associated contacts 223 are only required to provide relatively low current, i.e. 85 milliamp signals to the processing circuitry 216. It may in some instances be helpful to increase that current a small amount to provide a known cleaning effect at the interface of the contacts and contact plate.

The selector switch 214 may conveniently be a plurality of momentary-action switches, such as the one illustrated for the selector switch position 4L, each switch being responsive to manual actuation for providing a short duration input signal to a respective input port of the processing circuitry 216. Those inputs are repetitively scanned and the most recent switch actuation is stored for determining the desired operating position until replaced by a newly selected position. Typically, actuation of a switch to a particular input port of circuitry 216 will result in the generation of a respective particular multi-bit code in circuitry 216 for comparison with a multi-bit code received from contact plate 222.

Similarly, the patterning of the conductive surface 61 on contact plate 222 is such that it, in combination with the nonconductive portion, may provide a four-bit digital code which is sensible by finger contacts $223_C$–$223_F$. Finger contacts $223_C$–$223_F$ comprise the outer four of six finger contacts $223_A$–$223_F$, each radially spaced for engagement with a respective arcuate path on the surface of plate 222. The patterning of the conductor surface 61 includes radially-innermost and radially-outermost arcuate portions each having sufficient angular extent to embrace the entire operating range. Moreover, the conductive surface 61 is singular and continuous such that an electrical potential applied to any one location thereon is available for the entirety of the surface 61. On the other hand, an electrical signal is extended from the signal processor 216 to both of the two radially innermost contacts $223_A$ and $223_B$, respectively via the conductive lead $235_A$ and $235_B$ to ensure application of the signal to the conductive surface, even in the event one of the two contact fingers $223_A$ or $223_B$ is faulty.

The patterning of the conductive surface 61 on the contact plate 222 is such that a different four-bit digital code is sensed by the array of four contacts $223_C$–$223_F$ at each of the different operating positions, N, 2H, 4H and 4L. Generally speaking, the patterning of the conductive and nonconductive portions of the contact plate 222 are fairly uniform, with the major breaks in such patterning being at those four positions which require detection. The angular extent of the breaks in the patterning which define the four positions is about 5° to either side of the radial centerline identifying that position. Thus, the patterning of conductor 61 is substantially constant for most of each quadrant, though it is not necessarily the same from quadrant to quadrant.

Conductive leads $235_C$–$235_F$ extend from contacts $223_C$–$223_F$, respectively to corresponding input ports of the signal processing circuitry 216. The leads $235_C$–$235_F$ collectively provide a four-bit digital code determined by the patterning of the contact plate 222 at its particular angular position and utilizing the electrical signal potential applied thereto via lead $235_A$ and $235_B$ and contacts $223_A$ and $223_B$. The position-identifying coded data on lines $235_C$–$235_F$ may be requested by the signal processing circuitry 216 only at such times as required for comparison with a corresponding demand signal from the selector switch 214.

With an input signal from selector switch 214 indicating a desired positioning of the vehicle drive gearing 6 and with the four-bit code extended from contact disc 222 serving to indicate the actual positioning of that gearing, the programing of the signal processing circuitry 216 is such as to effect a comparison and the requisite response as previously described. Such response typically requires a speed input from the speed sensor 44 and an input from the VEHICLE NEUTRAL switch 46. That response is also operative to control illumination of the the lights 48 and 50 as previously described.

Additionally, the signal processing circuitry 216 which typically utilizes low voltage, low current, high speed signals is required to provide relatively higher current outputs to the relays 70 and 75 as well as to the electrical clutch 11. Accordingly, latched output signals from the low current portion of processing circuitry 216 may be extended to the respective relays 70 and 75 via respective power buffering circuits 80 and 82. Similarly, the five second signal for energizing electrical clutch 11 is applied to conductive lead 42 via a suitable power buffer or switch 84. As an alternative to the relay-actuated contactors for controlling the current path to the motor, it will be understood that semiconductor switch devices of an adequate current-carrying capacity may replace the relays 70 and 75, the respective contactors 70' and 75' and the buffering circuits 80 and 82. A similar device may be used as switch 84.

The signal processor 216 has the further capability of analyzing each of the four-digit codes received on leads $235_C$–$235_F$ to determine whether it is a potentially valid code or if it is necessarily an invalid code. If an invalid code is detected, an unsafe response is prevented.

In yet another embodiment of the shift actuation system 10, the conductive patterning of the contact plate 22 may be very similar to that of contact plate 122 in the FIG. 4 embodiment. However, unlike the FIG. 4 embodiment, the selector switches may be more similar to those of the FIG. 5 embodiment and extend their relatively low current inputs directly to the associated signal processor circuitry rather than extending them through the position-indicating contact plate.

Although this invention has been shown and described with respect to detailed embodiments thereof, it will be understood by those skilled in the art that various changes in from and detail thereof may be made without departing from the spirit and scope of the claimed invention. For instance, the NEUTRAL position and function N might be deleted from the selector switch, the position indicator and the control circuitry if it is not to be selectable by the operator.

Having thus described a typical embodiment of our invention, that which is clamed as new and desired to secure by Letters Patent of the United States is:

1. An electrical shift actuator for a vehicle transfer case adapted to be driven by a vehicle transmission which includes a neutral condition, the transfer case including vehicle drive gearing and being responsive to a bidirectional rotary input for placing said gearing into selected ones of a plurality of operating states, all of said plurality of operating states being attainable within a predetermined angle of rotation of said rotary input, the shift actuator comprising:

a rotary drive means operatively connected to provide said bidirectional rotary input to said transfer case, said rotary drive means including bidirectional motor means for determining the rotational position of said rotary drive means;

means for indicating the rotational position of said rotary drive means thereby to provide an indication of the existing operating state of said vehicle drive gearing, said indicating means including first and second relatively movable parts, said first part being stationary and said second part being mounted to rotate with said rotary drive means and wherein at least one of said first and said second parts is operative to provide an electrical signal indicative of the rotational position of said rotary drive means;

selector switch means for providing an electrical signal representative of a desired state of the vehicle drive gearing; and electrical control means responsive to said signal representative of a desired state of vehicle drive gearing and to said signal indicative of the existing rotational position of said rotary drive means for effecting movement of said motor means in a predetermined one or the other of said directions until the desired vehicle drive gearing state is attained, said electrical control means further including means for sensing at least one vehicle operating condition from the group including vehicle speed and state of the transmission relative to its neutral condition, said electrical control means being inhibited from effective movement of said motor to place the drive gearing in a certain one from a certain other of said vehicle drive gearing states at least until said vehicle speed satisfies a predetermined threshold or said transmission state satisfies a predetermined threshold interval in the neutral condition, respectively.

2. The shift actuator of claim 1 wherein said first part of said rotary drive means position indicating means comprises a plurality of electrical contacts and said second part of said rotary drive means position indicating means comprises a surface having a respective plurality of arcuate paths thereon underlying and in engagement with respective said contacts, first predetermined portions of said arcuate paths being conductive and other predetermined portions of said paths being nonconductive, means for applying an electrical potential to at least some of said electrically conductive path portions, and wherein said conductive and nonconductive path portions are patterned relative to said contacts to provide electrical signal indications representative of a plurality of respective positions each representative of a respective one of said operating states of said drive gearing.

3. The shift actuator of claim 2 wherein said electrical control means includes a pair of motor contactor relays, each relay of said pair being operative to control operation of said motor means in a respective opposite one of its two directions of motion, conductor means operatively connected between each said relay and predetermined ones of said contacts and wherein an electrical current sufficient to actuate a respective said relay may be conducted through a respective said conductive path portion, contact and conductor means when the respective said contact engages a respective said conductive path portion having a potential applied thereto.

4. The shift actuator of claim 2 wherein said indicating means second part comprises a plate affixed to said rotary drive means, said surface of said plate on which said conductive path portions are disposed being substantially perpendicular to the rotational axis of said rotary drive means.

5. The shift actuator of claim 4 wherein said motor means is a rotary DC motor, said rotary drive means additionally including reduction gearing having an input and an output for translating an angular increment of rotary input thereto from said motor means into a smaller angular increment of rotational output, said indicating plate being affixed to rotate angularly in unison with said output of said reduction gearing, and wherein said output of said reduction gearing is connected in angular unison with said rotary input to said transfer case.

6. The shift actuator of claim 5 wherein said predetermined angle of rotation of said rotary input within which all of said plurality of operating states of said vehicle drive gearing are attainable is less than 360°.

7. The shift actuator of claim 2 wherein said electrical control means includes switch means responsive to a first direction signal for effecting rotation of said motor means in a predetermined one of its two directions and responsive to a second direction signal for effecting rotation of said motor in its other direction, and said control means providing a respective said first direction signal or a respective said second direction signal as a function of at least a comparison of said signal representative of a desired state of vehicle drive gearing with said signal indicative of the existing rotational position of said rotary drive means.

8. The shift actuator of claim 7 wherein said electrical contacts of said indicating means first part are arrayed along a substantially radially extending line relative to the rotation of said indicating means second part and wherein said conductive and nonconductive path portions on said surface of said indicating means second part are patterned to provide a respective different multi-bit conduction code underlying said arrayed electrical contacts at each of a plurality of angularly spaced positions on said indicating means first part, each said position corresponding with a respective drive gearing state and providing a respective signal commensurate therewith.

9. An electrical shift actuator for a vehicle transfer case adapted to be driven by a vehicle transmission, the transfer case including vehicle drive gearing and being responsive to a bidirectional rotary input for placing said gearing into selected ones of a plurality of operating states, all of said plurality of operating states being attainable within a predetermined angle of rotation of said rotary input, the shift actuator comprising:

a rotary drive means operatively connected to provide said bidirectional rotary input to said transfer case, said rotary drive means including bidirectional motor means for determining the rotational position of said rotary drive means;

means for indicating the rotational position of said rotary drive means thereby to provide an indication of the existing operating state of said vehicle drive gearing, said indicating means including first and second relatively movable parts, said first part being stationary and said second part being mounted to rotate with said rotary drive means and wherein at least one of said first and said second parts is operative to provide electrical signal indications representative of a plurality of respective positions each representative of a respective one of said operating states of said drive gearing;

selector switch means for providing an electrical signal representative of a desired state of the vehicle drive gearing; and electrical control means responsive to said signal representative of a desired state of vehicle drive gearing and to said signal indicative of the existing rotational position of said rotary drive means for effecting movement of said motor means in a predetermined one or the other of said directions until the desired vehicle drive gearing state is attained, said electrical control means further including means for sensing vehicle speed and for determining whether the speed either is below or exceeds a predetermined threshold, and wherein said electrical control means is inhibited from effecting movement of said motor to place the drive gearing in a certain one from a certain other of said vehicle drive gearing states at least while said speed threshold is exceeded.

10. The shift actuator of claim 9, an electric clutch being associated with the transfer case and being responsive to a control signal to assist in synchronizing the vehicle drive gearing during shifting, and wherein said electrical control means is responsive to said selector switch means being actuated from a particular desired drive gearing state to a different desired drive gearing state for providing a time control signal of predetermined duration for extension to said electric clutch.

11. The shift actuator of claim 9 wherein the drive gearing states include two-wheel high (2H), four-wheel high (4H) and four-wheel low (4L), said selector switch means being selectively actuable to provide signals indicative of respective desired states, and wherein said electric control means is responsive to said selector switch means being actuated, when the existing state is two-wheel high and in the manner for selecting the four-wheel low state, to thereby effect movement of said motor means to attain a preliminary four-wheel high state and to effect further movement of said motor means to attain said four-wheel low state only when said speed threshold is not exceeded.

* * * * *